US007662002B2

(12) United States Patent
Johnston

(10) Patent No.: US 7,662,002 B2
(45) Date of Patent: Feb. 16, 2010

(54) CARBON FIBER TOW TERMINATION AND METHOD FOR MAKING

(75) Inventor: James J. Johnston, St. Petersburg, FL (US)

(73) Assignee: Methode Electronics, Inc., Rolling Meadows, IL (US)

( * ) Notice: Subject to any disclaimer, the term of this patent is extended or adjusted under 35 U.S.C. 154(b) by 0 days.

(21) Appl. No.: 12/023,549

(22) Filed: Jan. 31, 2008

(65) Prior Publication Data

US 2008/0182461 A1 Jul. 31, 2008

Related U.S. Application Data

(60) Provisional application No. 60/898,607, filed on Jan. 31, 2007.

(51) Int. Cl.
*H02G 15/02* (2006.01)

(52) U.S. Cl. .................................... 439/874; 174/88 R

(58) Field of Classification Search ................. 439/874; 174/88 R

See application file for complete search history.

(56) References Cited

U.S. PATENT DOCUMENTS

| | | | | |
|---|---|---|---|---|
| 6,135,829 | A * | 10/2000 | Johnston | 439/874 |
| 6,547,606 | B1 * | 4/2003 | Johnston et al. | 439/708 |
| 7,247,822 | B2 * | 7/2007 | Johnston | 219/549 |

* cited by examiner

*Primary Examiner*—Neil Abrams
(74) *Attorney, Agent, or Firm*—McCormick, Paulding & Huber LLP

(57) ABSTRACT

Discrete portions of a carbon fiber tow, selected from a group of tows, ranging in number of fibers from about 1,000 to about 150,000, and terminated by discrete contact portions of a metal conductor within a non-metallic termination assembly formed by the joinder of a cradle and a cap defining opposing parallel clamping surfaces receiving the tow portions and the contact portions in crossing engagement therebetween. Opposing energy directors on the cradle and cap serve as temporary guide rails for positioning the carbon fiber portions before and during assembly. Meltdown of the energy directors during a pressure and ultrasonic welding cycle enable self-leveling of the carbon fiber portions whereby uniform distribution of carbon fiber over the entire cross section of each of the carbon fiber portions of the assembly may be attained. The clamping surfaces remain intact after welding and retain clamping integrity.

20 Claims, 9 Drawing Sheets

CARBON FIBER TOW TERMINATION AND METHOD FOR MAKING

CROSS REFERENCE TO RELATED APPLICATION

This application claims the benefit of U.S. Provisional Application No. 60/898,607, filed Jan. 31, 2007, the disclosure of which is herein incorporated by reference in its entirety.

FIELD OF INVENTION

This invention relates in general to electrical connections and methods for making such connections and deals more specifically with carbon fiber tow heating element assemblies and methods for making such heating element assemblies for electrical heating applications.

BACKGROUND OF THE INVENTION

The primary objective of the present invention is to provide a suitable non-metallic electrical carbon fiber tow heating element assembly to enable participation in a large portion of the heating element market, namely that portion of the market producing products requiring heat output in the range of 200 to 600 degrees F. Heretofore terminations have been developed for various forms of carbon fiber, however such carbon fiber heating element assemblies usually employ some form of mechanical clamping utilizing a metal plate or plates clamped together in holding engagement by threaded fasteners or adjustable fasteners of other types. Such terminations are generally difficult and expensive to make and are often prone to premature failure.

Two earlier patents to Applicant and relating to non-metallic electrical terminations, U.S. Pat. No. 6,135,829 for Electrical Connection and U.S. Pat. No. 5,857,259 for Method for Making an Electrical Connection, are concerned with technology originally developed for the production of high density electrical termination assemblies and heating applications for the low temperature end of the heating spectrum (100-170 degrees F.) and work well at current limits of 1.5 amperes or less. However the need for new technology becomes apparent after extensive testing of companion carbon fiber electrically terminated product assemblies fail to adequately perform when applying higher amperage (2 to 5 amps) to the tow form of carbon fiber. Unlike other forms of carbon fiber, mainly, inks, mats, broken strand yarn bundles and woven surfaces, all of which feature consistent and uniform surface fiber configuration, the carbon fiber tow form proves virtually impossible to confine in an exacting level position prior to the application of ultrasonic energy required to weld such a plastic termination system together. Due to the relatively high resistance of the carbon fiber tow it is concluded that a single wire mating surface area is insufficient to enable a suitable high current electrical termination.

SUMMARY OF THE INVENTION

In accordance with the present invention, a two-part dielectric ultrasonically weldable termination assembly is provided for forming a matrix of discrete electrical junctions between a carbon fiber tow and a single metal conductor having a plurality of discrete contact portions. The termination assembly includes a lower cradle member and an upper cap member which respectively define substantially planar upper and lower cradle and cap clamping surfaces arranged in opposing relation to each other. Opposing energy directors include secondary energy directors carried by the cradle member and primary energy directors carried by the cap member which temporally serve as guides for positioning the tow and the conductor prior to and during assembly. Self-leveling of the carbon fiber occurs during the ultrasonic welding process with retention of clamping integrity. The termination assembly is universal for a wide range of carbon fiber tows.

DETAILED DESCRIPTION OF PREFERRED EMBODIMENTS

Figure 1:
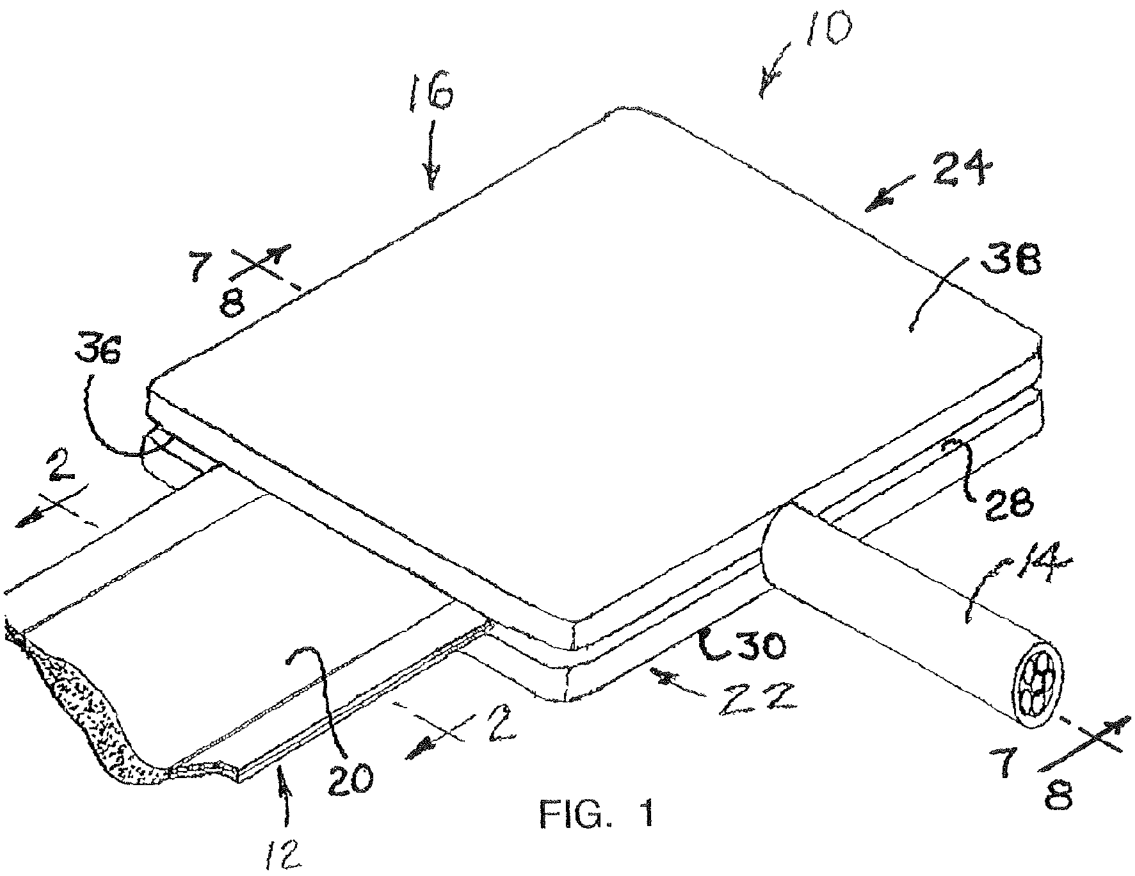
FIG. 1 is a fragmentary perspective view of a carbon fiber tow heating element assembly made in accordance with the present invention.

Turning now to the drawings and referring first particularly to FIGS. 1-8, a typical carbon fiber tow heating element assembly embodying the present invention and made in accordance with the invention is shown in FIG. 1 and indicated generally by the reference numeral 10. The illustrated heating element assembly 10 essentially comprises a carbon fiber tow indicted generally at 12, adapted for use as a heating element and terminated by an insulated stranded seven wire conductor 14 within a termination assembly designated generally by the reference numeral 16.

Figure 2:
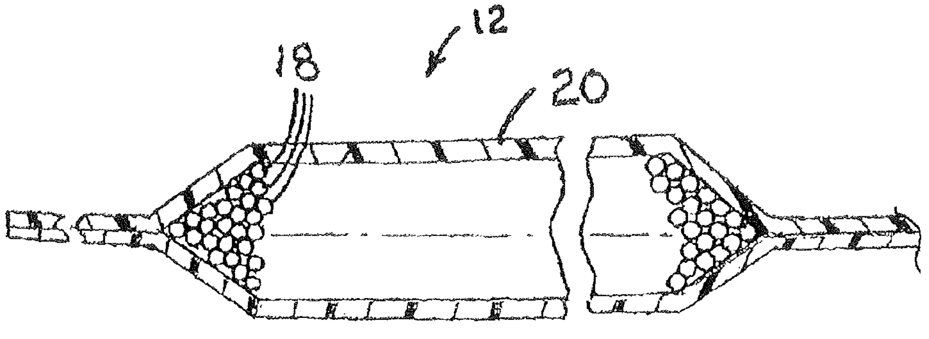
FIG. 2 is somewhat enlarged diagrammatic sectional view through the carbon fiber tow taken along the line 2-2 of FIG. 1.

The invention is presently practiced with an electrically insulated carbon fiber tow having from about 1,000 to about 100,000 generally cylindrical carbon filaments or fibers 18, 18 each having a diameter ranging from 6 to 10 microns and an electrical resistant (cold) in the range of 2 to 3 ohms per linear foot, plus or minus 0.10 ohm, a 50K tow having about 50,000 filaments of 7 micron diameter being a presently preferred form. Tows are obtained from a supplier by fiber count designation. However, it is not feasible to verify the fiber counts. The flexible carbon filaments which comprise the tow are of indeterminant length and are disposed in generally side-by-side parallel relation to each other. Prior to termination, the carbon fiber filaments are disposed within a single bundle having a substantially uniform somewhat flattened, generally oval or elliptical cross section throughout its entire length, substantially as shown in FIG. 2. The bundle is contained within an outer dielectric insulating jacket indicated by the numeral 20.

A commercial grade carbon fiber tow, that is a tow which is 94-96% per carbon by weight may be employed in practicing the invention. A tow of military grade may also be employed. However, a tow of the latter type, which is 98% pure carbon by weight, is considerably more expensive to produce and, for this reason, a commercial grade material is presently preferred. A commercial grade tow should result in a heating element suitable for most heating applications.

The carbon fiber tow 12 used in practicing the invention is selected from a group of tows each having a bundle of carbon fibers or filaments 18,18 ranging in number from about 1,000 to about 150,000 and which differ substantially from each other in number of fibers. A typical group of tows may, for example, consist of a 1K tow having about 1,000 fibers, a 3K tow, a 6K tow, a 12K tow, a 24K tow, a 48K tow, a 50K tow and a 150K tow. The conductor 14 for terminating the selected tow has a plurality of discrete electrical contact portions and is selected from a group of conductors which differ from each other in size and/or form, as will evident from the further description which follows. The presently preferred conductor 14 has seven (7) discrete portions.

The tow 12 and the conductor 14 enter the termination assembly 16 at a generally right angle to each other, substantially as shown in FIG. 1. The 7 individual strands which comprise the stranded wire conductor 14 are separated from each other within the termination assembly 16, traverse associated portions of the tow, are also separated from each other, forming a number of discrete areas of electrical contact or termination within the termination assembly. The numerous areas of discrete electrical contact provide electrical contact redundancy and together comprise the electrical termination matrix, as will be hereinafter evident from the further description which follows.

The termination assembly 16 and the method for making the termination 10 are quite versatile in that the assembly and method may be utilized to produce a number of different terminations each of which may differ from the other in both its physical and electrical characteristics.

The process for making the heating element 10 commences with forming of the termination assembly 16, shown in assembled condition in FIG. 1. The termination member 16 is formed by the ultrasonic welding jointer of an energy director cradle, indicated generally at 22 in FIG. 4, with an energy director cap, designated generally by the reference 24 and shown in an inverted position in FIG. 3. The cradle 22 and the cap 24 are of somewhat similar construction and, as shown, comprise generally complementary rectangular plates made from dielectric ultrasonically weldable thermoplastic material, which may be of either an amorphous or semi-crystalline type.

Figure 4:
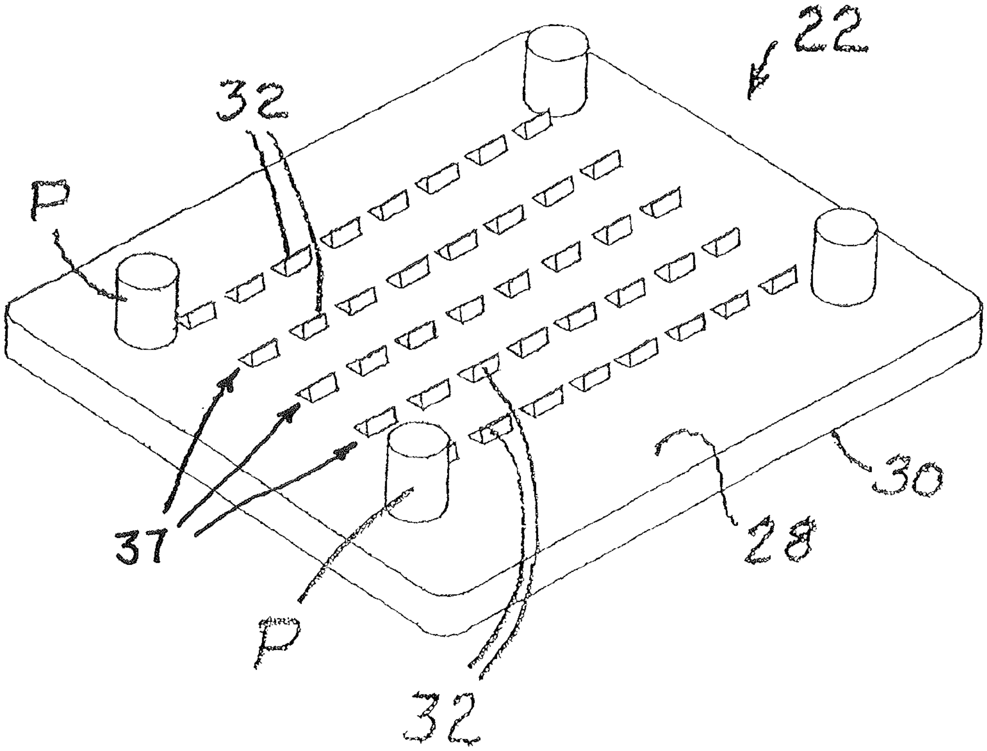
FIG. 4 is a perspective view of the energy director cradle of FIG. 1.

The presently preferred energy director cradle 22, best shown in FIG. 4, preferably comprises a generally rectangular plate of substantially uniform thickness and has substantially smooth planar inner and outer surfaces 28 and 30, respectively, which are parallel to each other. The cradle 22 further includes a plurality of integral secondary energy directors 32, 32 positioned on and projecting from the flat inner clamping surface 28. The number and arrangement of energy directors used in practicing the invention may vary and will be determined by the intended usage of the termination assembly 16 and more specifically by the amount of electrical current to be carried by the terminated carbon fiber tow or heating element to produce a desired heat output. However, the presently preferred termination assembly 16 is intended for at least limited universal usage to accommodate a chosen carbon fiber tow selected from a group of different insulated carbon fiber tows for termination by a selected one of a number of different electrical conductors which may differ from each other in both size and/or form to satisfy various heating element requirements for a wide range of products. The illustrated cradle 22 is provided with forty (40) secondary energy directors, a relatively large number for use in terminating a single electrically conductive member, all or less than all of which may be directly employed in making a particular termination, as will be evident from the further description which follows.

The forty (40) integral secondary energy directors indicated by the numerals 32, 32 carried by the cradle 22 are arranged on and project from the flat generally rectangular inner surface in five transversely spaced apart parallel longitudinally extending columns, indicated generally at 37, 37 with 8 (eight) uniformly longitudinally spaced apart secondary energy directors in each column, as best shown in FIG. 4. Each secondary energy director 32 has a uniform triangular cross-sectional configuration throughout with an included apex angle of approximately seventy (70) degrees, a height dimension of 0.020 inches, a transverse base width of 0.016 inches, and a base length of 0.040 inches. The bases of the secondary energy directors 32, 32 are located on the inner or cradle surface 28. Ridge lines at the apexes of the secondary energy directors lie within a common plane parallel to the plane of the surface 28. The secondary energy directors in each column cooperate with those in an immediately adjacent column and with a portion of the surface 28 bounded by the two adjacent columns to define a temporary tow guideway for use prior to and during assembly of a termination. Thus, the five columns of secondary energy directors provide four such guideways to receive four stacks of carbon fiber.

Figure 3:
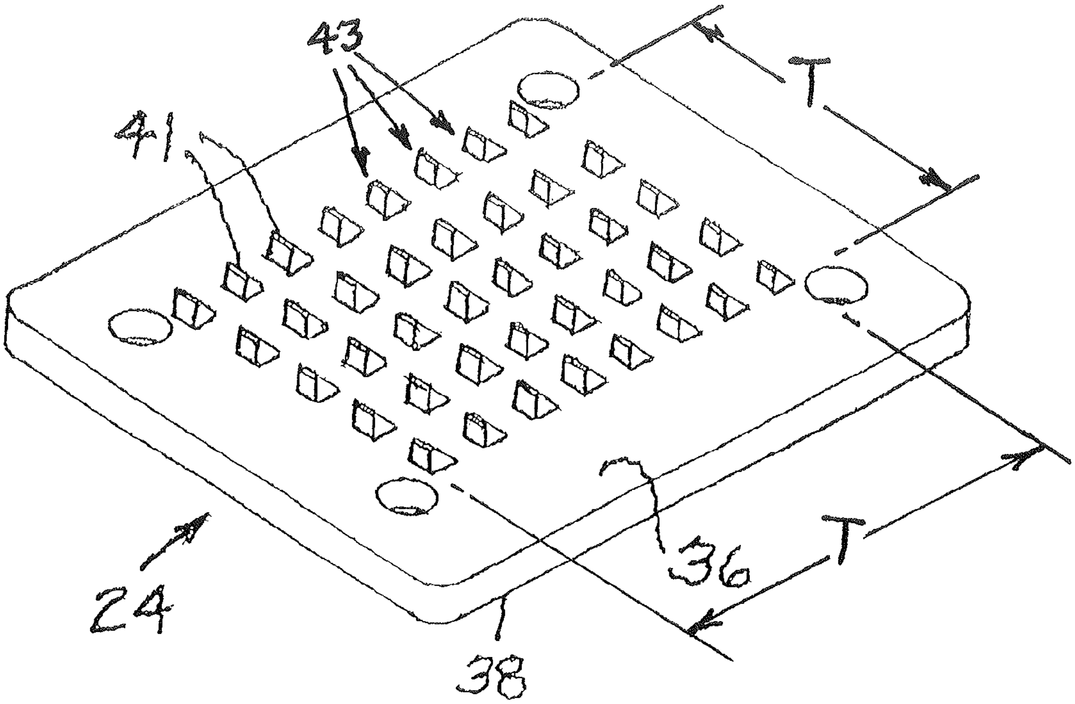
FIG. 3 is a perspective view of the energy director cap of FIG. 1 shown in an inverted position relative to its position in FIG. 1.

The dielectric ultrasonically weldable energy director cap 24, shown inverted in FIG. 3, comprises a generally rectangular plate, preferably of substantially uniform thickness, which generally compliments the cradle plate. The energy director cap inner surface, indicated at 36, is smooth, substantially flat or planar, and parallels the preferably smooth substantially planar outer surface of the cap indicated at 38. Forty (40) integral primary energy directors 41, 41 are carried by the cap 24 and project from its inner surface 36. The 40 (forty) primary energy directors 41, 41 are arranged in eight (8)

longitudinally spaced apart rows 43, 43 which extend transversely of the cap inner surface 36. There are 5 (five) transversely spaced apart primary energy directors 41, 41 in each row. Each primary energy director 41 has a height dimension above the surface of 0.040 inches (twice the height of the secondary energy directors), and a longitudinal width of 0.038 inches. The triangular cross-section of each primary energy director has an included angle at its apex of approximately 90 degrees. The ridge lines at the apexes of he primary energy directors in each row are transversely aligned and parallel to the surface 36. Each primary energy director has a base length of 0.040 inches measured in a transverse direction relative to the plate 34. The 8 rows of primary energy directors are spaced apart to accommodate seven (7) solid or stranded wire conductors of 0.032 inch diameter maximum in the guidepaths defined by adjacent rows of primary energy directors 41, 41. The rows of primary energy directors 41, 41 form the boundaries of a rectangular area of termination on the cap surface 36 indicated by the letters T and T' on FIG. 3. The bases of the primary energy directors 41, 41 occupy at least 50 percent of this rectangular area of termination. This relationship aids in attainment and maintenance of desired cradle and cap clamping force.

The 4 (four) longitudinally extended spaces defined by the 5 (five) rows of secondary energy directors are designed to each accommodate a bundle of fibers containing about 25 percent of the fibers in the largest tow to be terminated while leaving sufficient portions of the secondary energy directors exposed to assured total meltdown of the secondary energy directors during assembly which, when smoothed to define a substantially level surface within an associated space. It has been found that a proficient assembly worker, with the aid of an energy director cradle to be loaded, can divide the approximately 50,000 carbon fibers contained within the single bundle of a 50K tow into 4 (four) substantially equal flattened bundles or stacks, each bundle being positioned within the longitudinally extending space between a pair of adjacent columns of secondary energy directors whereby to provide 4 (four) flattened stacks of carbon fiber. This premise provides a foundation for reasoning that the present goal of achieving satisfactory termination with repeatability can be attained with the present method of termination.

Preparatory to making the heating element assembly 10 an end portion of the tow 12 to be terminated is stripped of insulation to expose a sufficient axial length of the single carbon fiber bundle which comprises the tow to enable termination.

In accordance with the presently preferred method for making the assembly 10 insulation is first stripped from end portions of the insulated 50K carbon fiber tow 12 and the No. 12 AWG insulated stranded copper conductor 14 to expose sufficient axial lengths of the electrically conductive carbon fiber and the stranded electrical conductors to enable electrical termination. Striping of the carbon fiber tow is best accomplished using an electrically heated nickel-chromium wire under tension. Since the melting temperature of the insulating sheath 20 is lower than that of the carbon fibers 18, 18 which form the single bundle of fibers within the sheath 20, the heated wire may be pressed against the sheath to cut entirely through this upper and lower layers and the marginal portions of the sheath without risk of damaging the individual carbon fibers.

Figure 5:
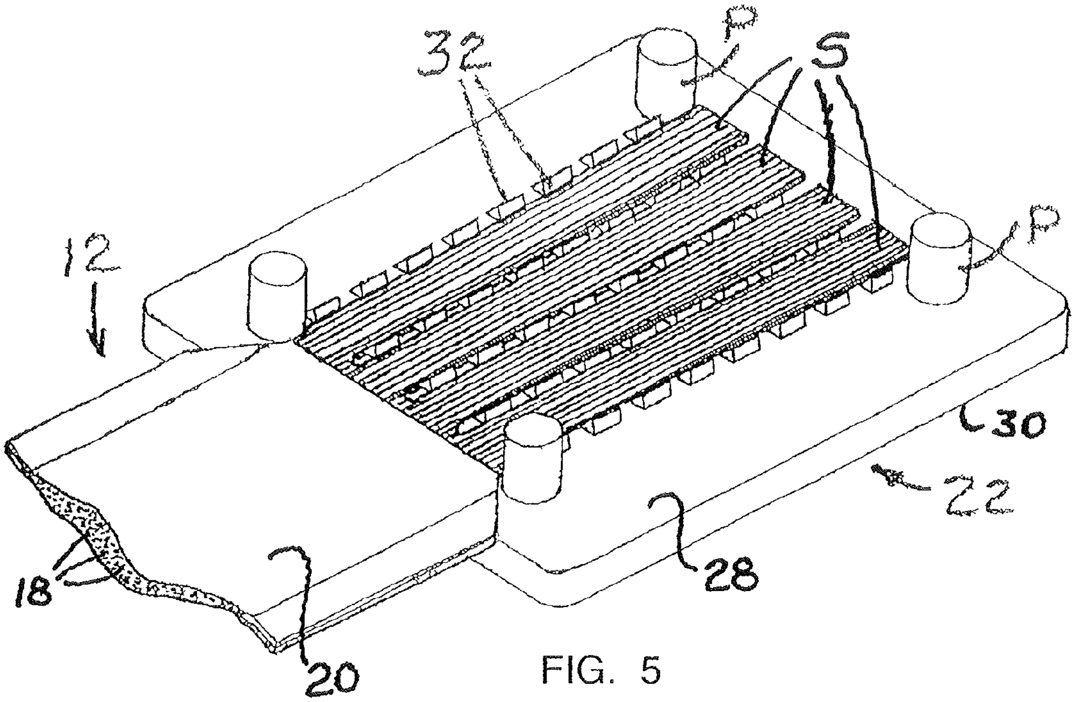
FIG. 5 is a fragmentary perspective view of a 50K tow shown loaded in the energy director cradle of FIG. 4, preparatory to assembly.

The insulated copper wire conductor 14 presents no unusual problem and may be stripped in any conventional manner. The stripped end portion of the conductor 14 may be preformed to facilitate rapid loading in the energy director cap 24 using a customized forming tool 45 such as the one shown in FIG. 15. In FIG. 5 the conductor 14 is shown after each of the pre-separated strands has been formed and positioned within a space defined by a pair of adjacent transversely extending rows of primary energy directors on the energy director cap 24.

Further, and in accordance with the presently preferred method for practicing the invention, the exposed end portion of the single bundle of carbon fibers which comprises the tow 12 is divided into 4 (four) substantially identical flattened bundles or stacks of fibers S, S, (FIG. 5) each divided bundle being wholly contained within an associated one of the longitudinally extending temporary alignment pathways defined by the 5 (five) parallel traversely spaced apart columns of secondary energy directors 32, 32 carried by the energy director cradle 22.

Since it is not feasible to perform the bundle dividing operation in a manner which will assure absolute identity of the multiple bundles by fiber count, the bundle dividing operation is manually performed by a skilled assembly worker with the aid of the energy director cradle 22 to be loaded. It has been found that a proficient assembler can readily position the exposed bundle of fibers on the cradle 22 so that all of the outboard fibers in the single bundle lie within the confines of the outboard columns of energy directors 32, 32. If a gentle leveling or smoothing operation is performed on the upper or exposed surface of the single tow as it is being seated on and between the upwardly projecting secondary energy directors 32, 32 some redistribution of the axially elongated parallel fibers will occur at the 70 degree apex portions of the inboard columns of secondary energy directors as the bundles are urged toward the planar inner surface of the energy director cradle and the inboard columns of projecting energy directors penetrate the single bundle dividing it into plural bundles. When this manual operation is performed by a skilled bench assembly worker the resulting 4 (four) flat bundles will be of reasonably uniform size and together will define a reasonably planar surface generally parallel to the substantially planar cradle inner or bottom clamping surface 28.

Figure 6:
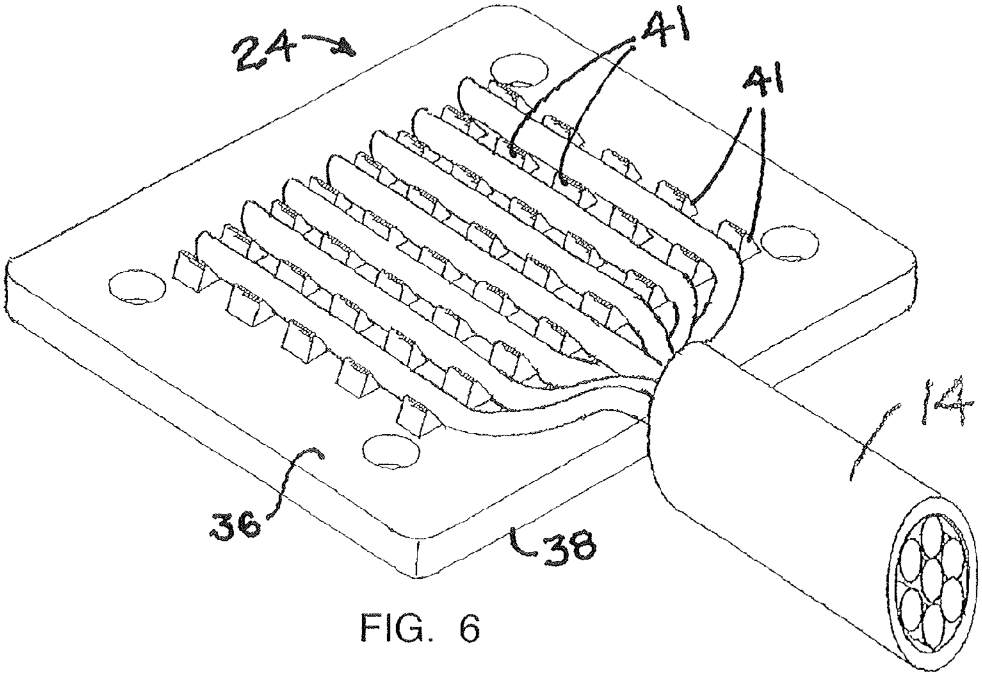
FIG. 6 is a fragmentary perspective view of the energy director cap of FIGS. 1 and 3, shown inverted with a typical seven strand electrical conductor loaded therein preparatory to formation of a carbon fiber tow heating element assembly.

The loaded energy director cap 24 shown in FIG. 6 is next assembled with the loaded energy director cradle 22 shown in FIG. 5. It is essential that some means be provided to maintain the cap and cradle in proper registry with each other during the ultrasonic welding operation by which the cap and cradle are permanently joined to form the termination assembly 16. The means for assuring proper registry may be a jig for cooperating with the two parts (cradle and cap) to align the two parts and maintain them in alignment during the further assembly operation or it may be a fixture carried by the ultrasonic welding machine. However, in accordance with the presently preferred method for practicing the invention integral alignment posts P, P are formed on one of the energy director plates which are received within complimentary alignment apertures in the other of the energy director plates. In the illustrated embodiment 10 the alignment posts P, P are carried by the energy director cradle 22. This arrangement is advantageous in that a number of these self-aligning cradle and cap parts may be loaded for termination, preassembled, and set aside for final ultrasonic welding assembly at a later time.

In accordance with the presently preferred method for practicing the invention, the pre-assembled termination is permanently assembled by a conventional ultrasonic welding operation. The energy director cradle is supported within a suitable fixture mounted on an ultrasonic welding machine while compressive force is applied to the energy director cap by the horn of the welding machine which also applies ultrasonic vibratory energy to the assembly in the regions of co-engagement between the primary and secondary energy directors.

Figure 7:
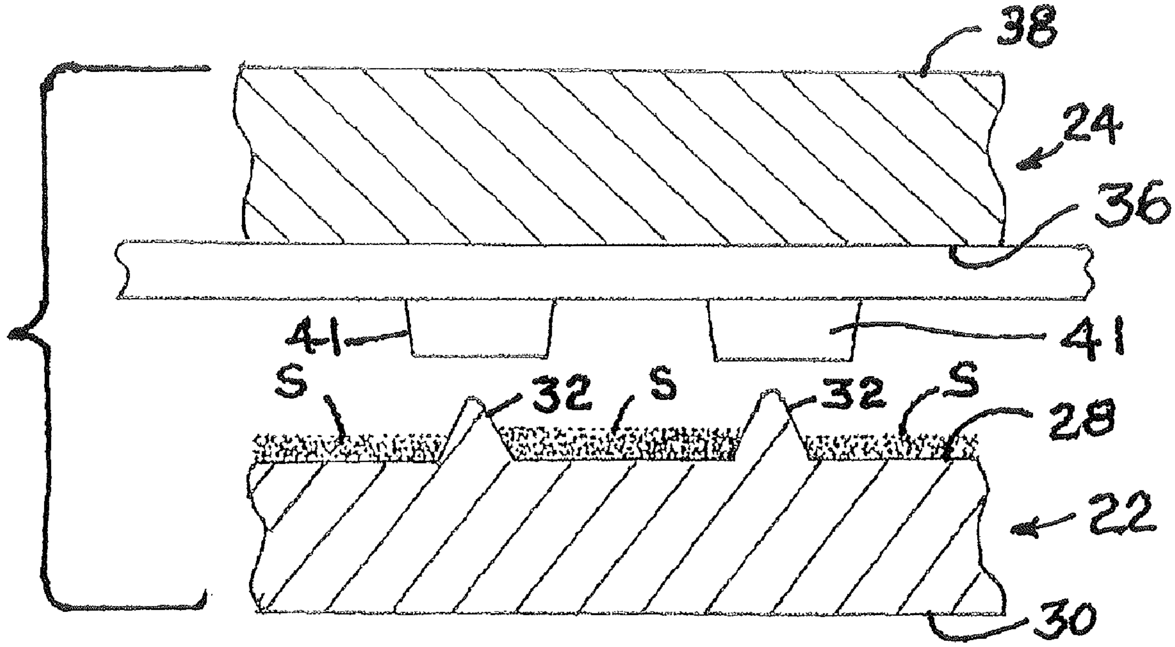
FIG. 7 is a somewhat enlarged fragmentary sectional view taken along the line 7-7 of FIG. 1 but shows the energy director cradle and cap immediately prior to assembly.

In FIG. 7 of the drawing, the loaded preassembled energy director cradle and cap are shown just prior to final assembly by ultrasonic welding. The stacks of carbon fiber which have been formed by manually dividing a tow have slightly differing stack heights and somewhat uneven upper surfaces.

The ultrasonic welding machine presently used in practicing the invention is a 1000 watt machine having a power supply which converts 115VAC 60 Hz electrical energy into 20 kHz electrical energy. Twenty cycles are employed for its larger vibratory stoke and a long weld time of 600 milliseconds at 60 joules of energy is used. A pneumatically activated carriage mechanism applies about 70 pounds of pressure to the preassembled parts and an electronic programmer controls ultrasonic exposure time and clamping time (for cooling). It is also possible to profile the power over the weld time duration for special heating effects.

Further, and in accordance with the presently preferred method for practicing the invention the pressure applied by the welding machine to the assembled termination member 16 is maintained for a period of time after application of vibratory energy has ceased. Presently, a one second cooling cycle time is found to be satisfactory for the production of an electrical termination of high integrity. Upon completion of the cooling cycle the finished electrical termination 10 may be removed from the ultrasonic welding machine.

Figure 8:
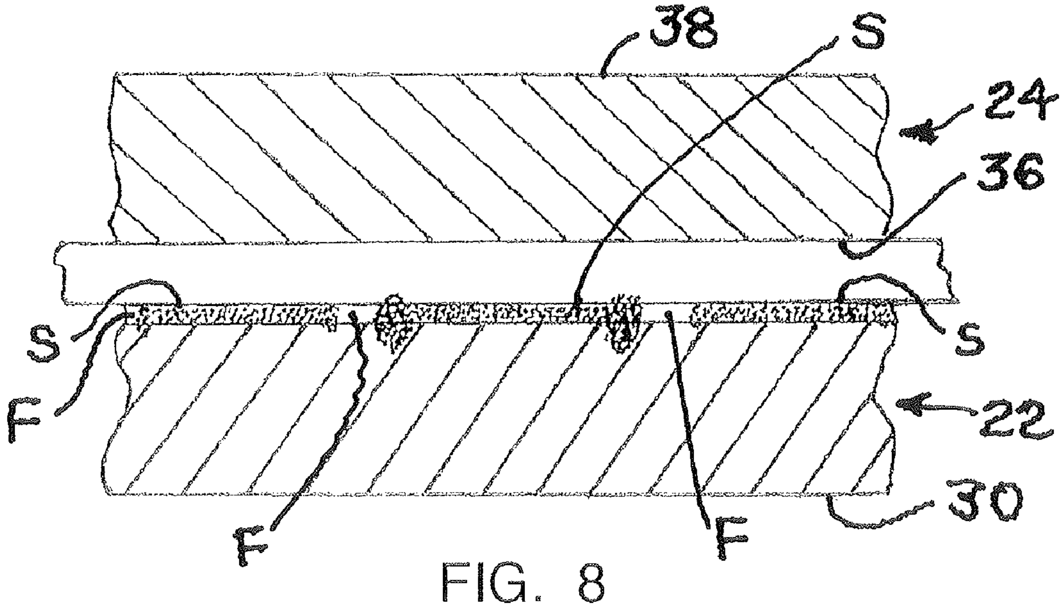
FIG. 8 is a somewhat enlarged fragmentary sectional view taken along the line 8-8 of FIG. 1 and shows the assembled energy director cradle and cap after assembly by ultrasonic welding.

FIG. 8 shows the cradle and cap after assembly by ultrasonic welding and the self-leveling condition that occurs during the welding cycle. As pressure is applied to the stacks of fiber 5, 5 by the illustrated conductor excess fiber in the higher stacks migrate or flow laterally into the molten energy director material which upon cooling become the fusions indicated by the letters F, F, which integrally connect the cradle and cap. The areas below the cradle clamping surface and above the cap clamping surface remain free of carbon fiber associated with the tow, except in the regions where the fusions F, F have formed on and in the cradle as shown in FIG. 8.

Samples of the completed electrical terminations should be electrically tested to ascertain that the finished terminations are performing satisfactorily to deliver desired heat output at required current loads. Samples of the heating element should also be dissected to further ascertain that the carbon fibers and the electrical conductors which comprise the completed or finished product are being adequately compressed so that the various carbon fibers and electrical conductors are substantially immobilized by the process to assure terminations of high integrity.

The height dimension of the outer surfaces of the energy director cradle and cap should be determined and recorded for each particular tow and conductor combination produced. The control settings for ultrasonic welder should also be recorded to enable future duplication of the conditions for product repeatability.

As previously noted, a heating device embodying the present invention and made in accordance with the invention has a wide variety of applications in many fields. In the automotive field, for example, heating elements have been employed in numerous devices for enhancing comfort of the driver and passengers, including heated steering wheels, heated seats, and heated outside mirrors. A typical heated steering wheel, for example, may include a heating element disposed between a frame of the steering wheel and an outer jacket covering the frame. A heating element embodying the preset invention and made in accordance with the invention is particularly suitable for use as a steering wheel heater. A presently preferred heating element, such as the element 10 hereinbefore described, has a single carbon fiber tow formed by 50000 individual carbon fiber filaments and has an electrical resistance of approximately 2 ohms per foot of axial length. Most motor vehicles in production today employ a 12 volt electrical system having an alternator with a usual output of thirteen two 14 volts DC. The vehicle is generally regulated to produce a 13 volt output.

The energy director system design for the present termination assembly has double the normal ratio of primary to secondary energy director height. EG: a primary to secondary height ratio of 0.040 to 0.020 inches at 90 degrees and 70 degrees, respectively. This arrangement of energy directors causes the bottom carbon fiber conductors in the energy director cradle to become extremely hot relative to the copper conductor in position within the energy director cap.

It should be noted that there is a gap between the parallel inner or clamping surfaces of the energy director cradle and the energy director cap both before and after the ultrasonic welding operation has been performed to assemble the latter two parts to form the termination member 16. This gap is ever present because the two parallel opposing inner or clamping surfaces do not come into confronting engagement at any stage of the present process. During the welding operation and while welding machine pressure is being applied to the energy director cradle and cap, the exposed portions of the 7 (seven) strands of copper wire which comprise the conductor 14 are disposed in direct and continuous contact with the substantially planar inner surface of the energy director cap along uninterrupted portions of their entire length and traverse the upper surfaces of the 4 (four) bundles of carbon fiber which are carried by the energy director cradle.

Sample heating elements were made and dissected. Both the cradle clamping surface and the cap clamping surface remain intact after assembly of the termination. The region of the cradle below the cradle surface remains free of carbon fiber associated with the tow.

Excess carbon fiber from the stacks divided from the tow migrate into the molten plastic material which had been the secondary energy directors 32, 32 prior to assembly and become lodged there during meltdown and cooling of the secondary energy directors to ultimately become embedded in a fusion or fusions resulting from the meltdown. Subsequently, electrical testing of termination assemblies produced in accordance with the present invention consistently result electrical resistance across the termination of less than 0.5 in milliohms.

The heating element assembly may be produced as an array including any number of individual tows. The number of tows provided being limited only by the capacity of the machinery available to produce the device.

Figure 9:
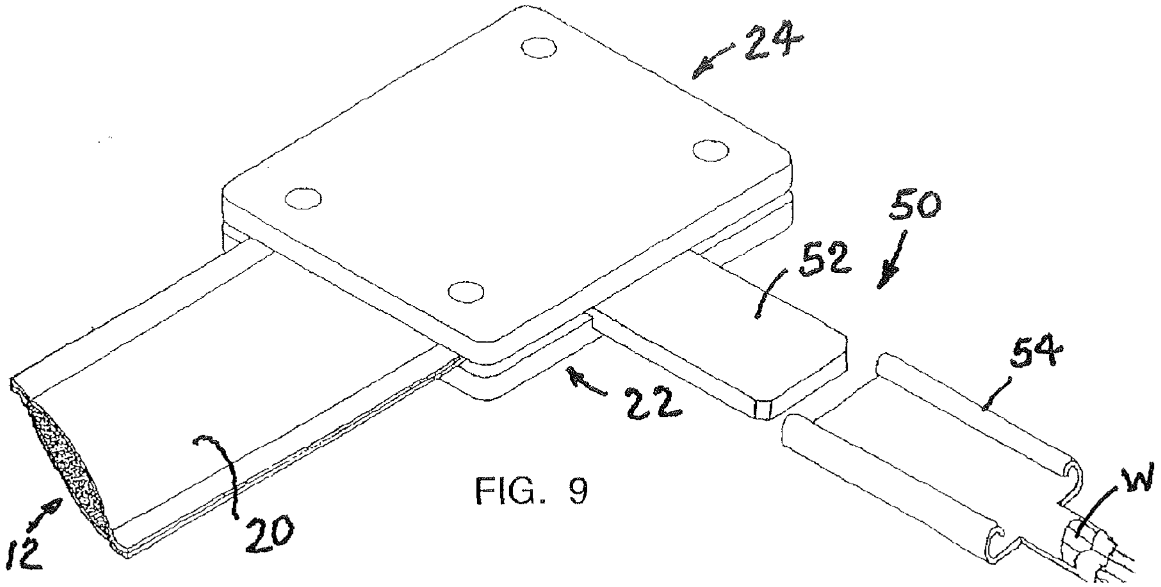
FIG. 9 is a fragmentary exploded perspective view of another carbon fiber tow heating element assembly which has a male electrical terminal shown with a mating female connector.
Figure 10:
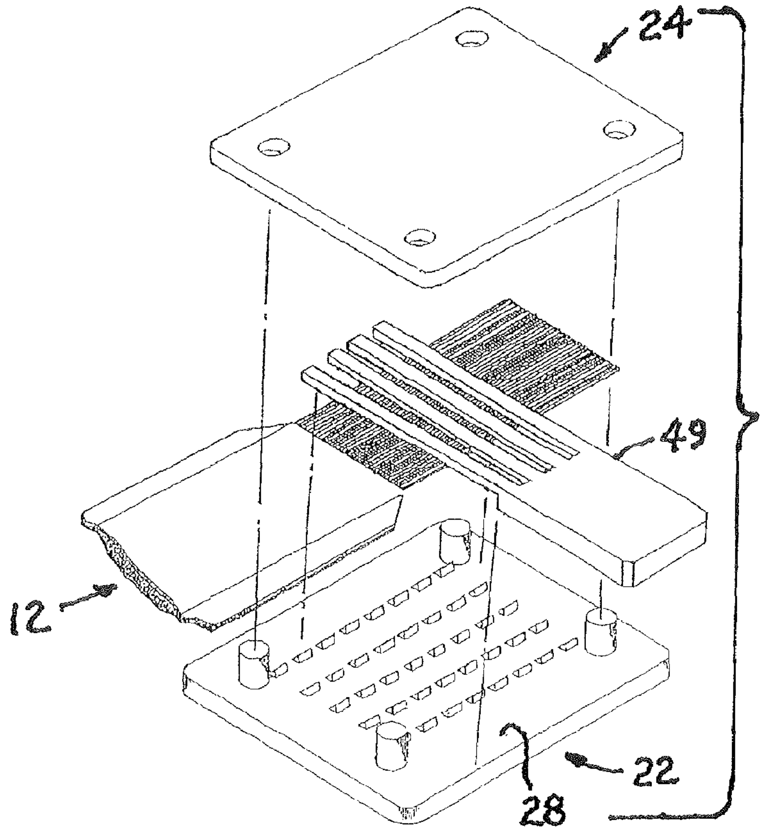
FIG. 10 is an exploded perspective view of the heating element assembly shown in FIG. 9.
Figure 11:
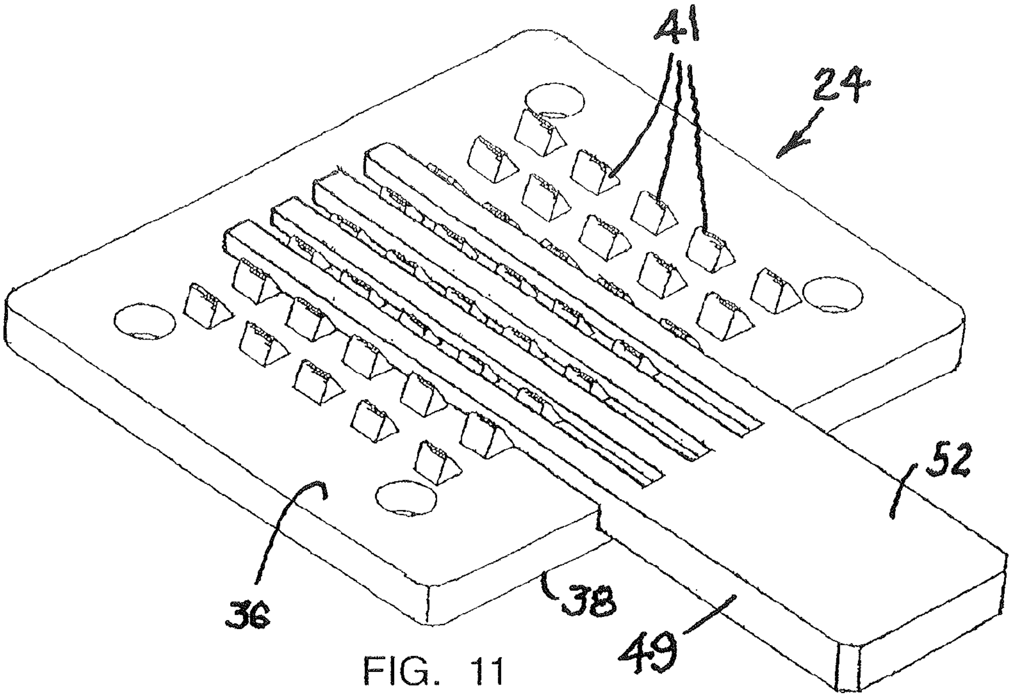
FIG. 11 is a perspective view similar to FIG. 6 but shows the conductor with male terminal loaded in the energy director cap of FIG. 10 prior to assembly.

Further considering the drawings and referring now to FIGS. 9-11 another heating element assembly made in accordance with the invention and embodying the invention is indicated generally at 10*a*. As in the previously described embodiment 10, the assembly 10*a* includes a 50K tow 12. However, unlike the previous embodiment the electrical conductor 14*a* for terminating the tow 12 comprises a slotted metal plate 49 which carries a electrical connector of a type well known in the electrical connector art and indicated generally at 50. The plate 49 includes a male tab 52 for mating connection with an associated female connector 54 shown crimped on a stranded wire W. The conductive metal plate, which may, for example, be formed from brass is stamped and formed to an appropriate configuration to provide a minimum of 4 (four) equivalent conductor paths for interfacing with the 4 (four) bundles of fiber formed by the division of the single bundle of fibers carried by the chosen tow 12*a*, as best shown in FIG. 10. The tab 52 is exposed externally of the termination to facilitate connection and disconnection.

Figure 12:
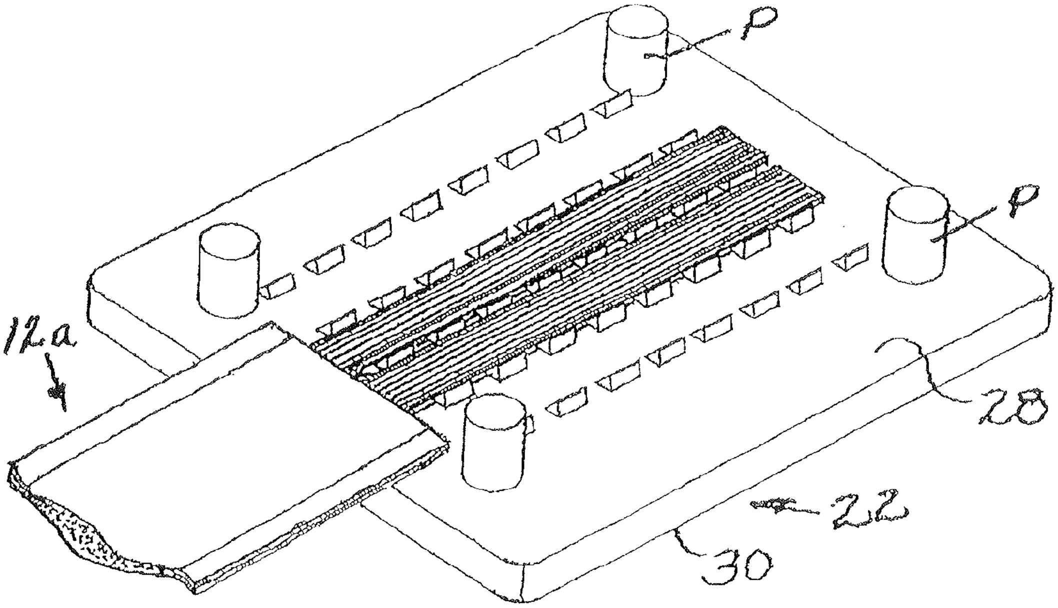
FIG. 12 is similar to FIG. 5 but shows a 25K carbon fiber tow loaded in a cradle prior to formation of an assembly.

In FIG. 12 a 25K insulated tow indicated at 12*a* is shown after it has been stripped and loaded in an energy director cradle 22, substantially identical to the cradle 22 previously described. The tow 12*a* has a single bundle of fibers which, is divided into two substantially equal bundles or stacks for termination. It will be noted that the terminal end of the insulation jacket 20*a* rests upon the cradle surface 28. When the tow 12*a* is terminated by the assembly of an associated energy director cap, the terminal end portion of the insulation jacket 20*a* will be disposed within the gap formed between the inner surfaces of the cap and the inner surface of its associated energy director cradle. The pressure applied to the resulting termination member will squeeze the terminal end portion of the insulation jacket which is gripped and retained within the gap by the opposing inner surfaces of the energy director cradle and the energy director cap. In some instances where an insulated carbon fiber tow is terminated by an insulated electrical conductor, the conductor may be anchored to the termination member by marginal portions of the cradle and cap generally as previously described.

If, for some reason, the terminated end portion of the insulation on the conductor is too large to be accommodated within the gap between the energy directors other provision for anchoring the electrical conductor to the termination assembly may be provided.

Figure 13:
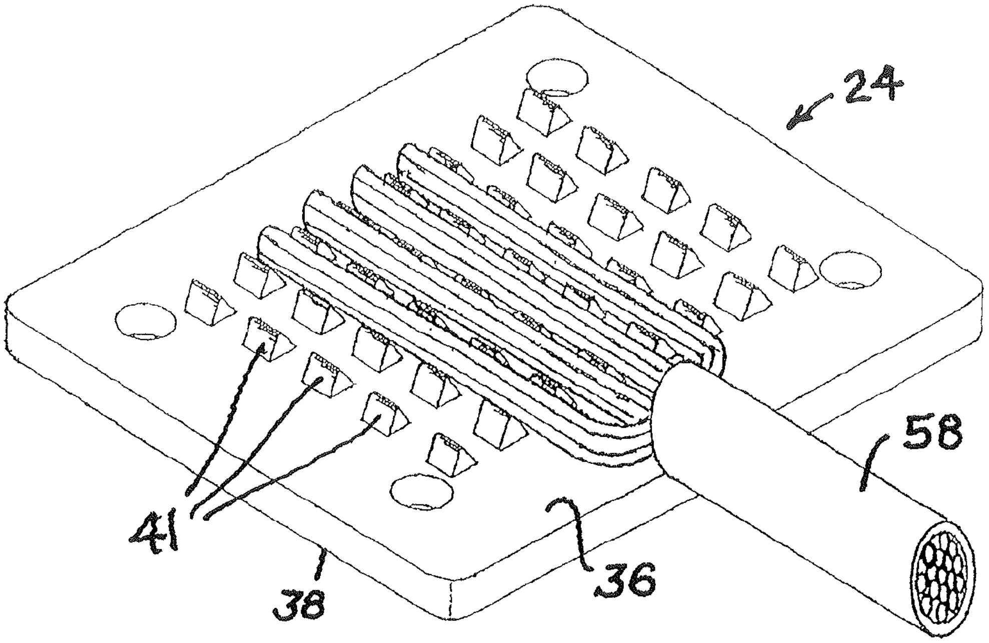
FIG. 13 is similar to FIG. 6 but shows an insulated No. 18AWG sixteen strand copper conductor after it has been stripped and loaded in an energy director cap prior to forming a heating element assembly.

The remaining drawings generally illustrate other types of metal conductors which may be utilized to terminate a carbon fiber tow. In FIG. 13 there is shown an AWG 18 sixteen (16) strand conductor 58 loaded in a universal energy director cap 24. The 16 strand conductor 58 is prepared for termination by first stripping insulation from the conductor or cable 58 and then separating the 16 strands, which form a single bundle, and reforming the exposed strands into 4 (four) separate and distinct bundles with 4 (four) strands in each bundle. Each bundle of four strands is then formed to be received within the energy director cap in the manner previously described. The resulting loaded energy director cap may thereafter be positioned in mating engagement with an energy director cradle carrying a 50K tow, such as shown in the example of FIGS. 1-8, a 25K tow exemplified by FIG. 12 or even a 1K tow (not shown).

Figure 14:
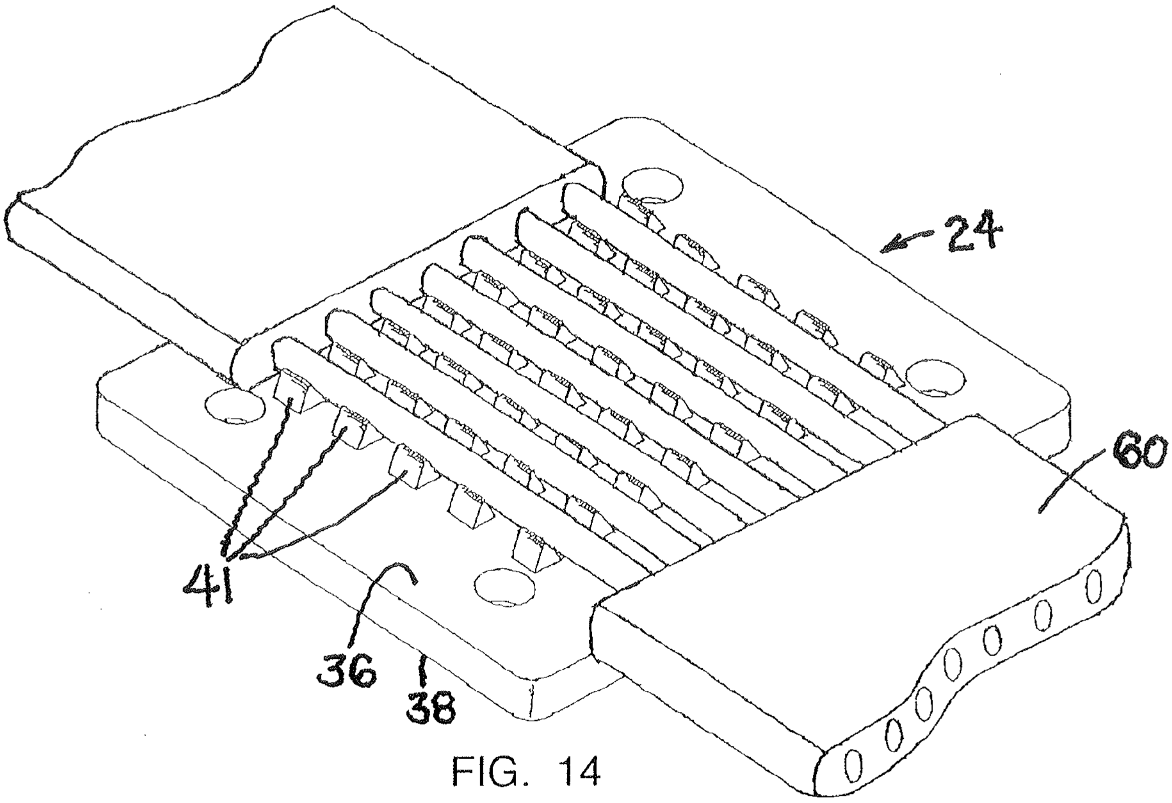
FIG. 14 is a fragmentary perspective view showing a No. 12AWG insulated buss bar loaded in the energy director cap for forming a termination with a carbon fiber tow.

In FIG. 14 yet another example of a loaded energy director cap is shown. Specifically, the cap 24 is loaded with an insulated conductor or buss bar 60. The illustrated buss bar has the insulation stripped from it in a region intermediate its ends and is shown loaded in an energy director cap 24 ready for mating engagement with an associated energy director cradle (not shown), which carries a selected tow to be terminated.

Figure 15:
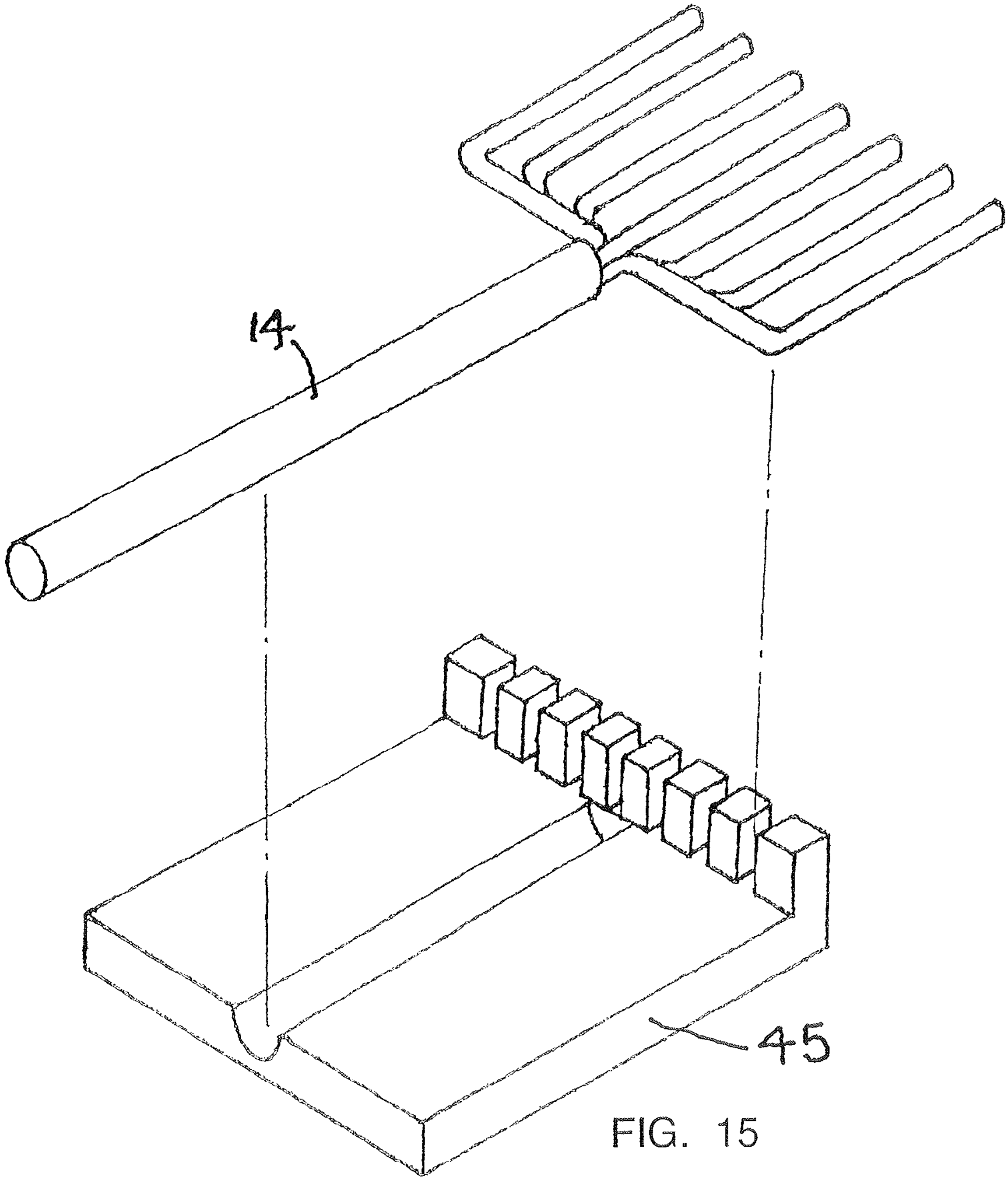
FIG. 15 is an exploded perspective view of a tool used to prep a wire conductor for use in the universal terminal assembly and a typical seven strand copper wire conductor after prep in the tool.
Figure 16:
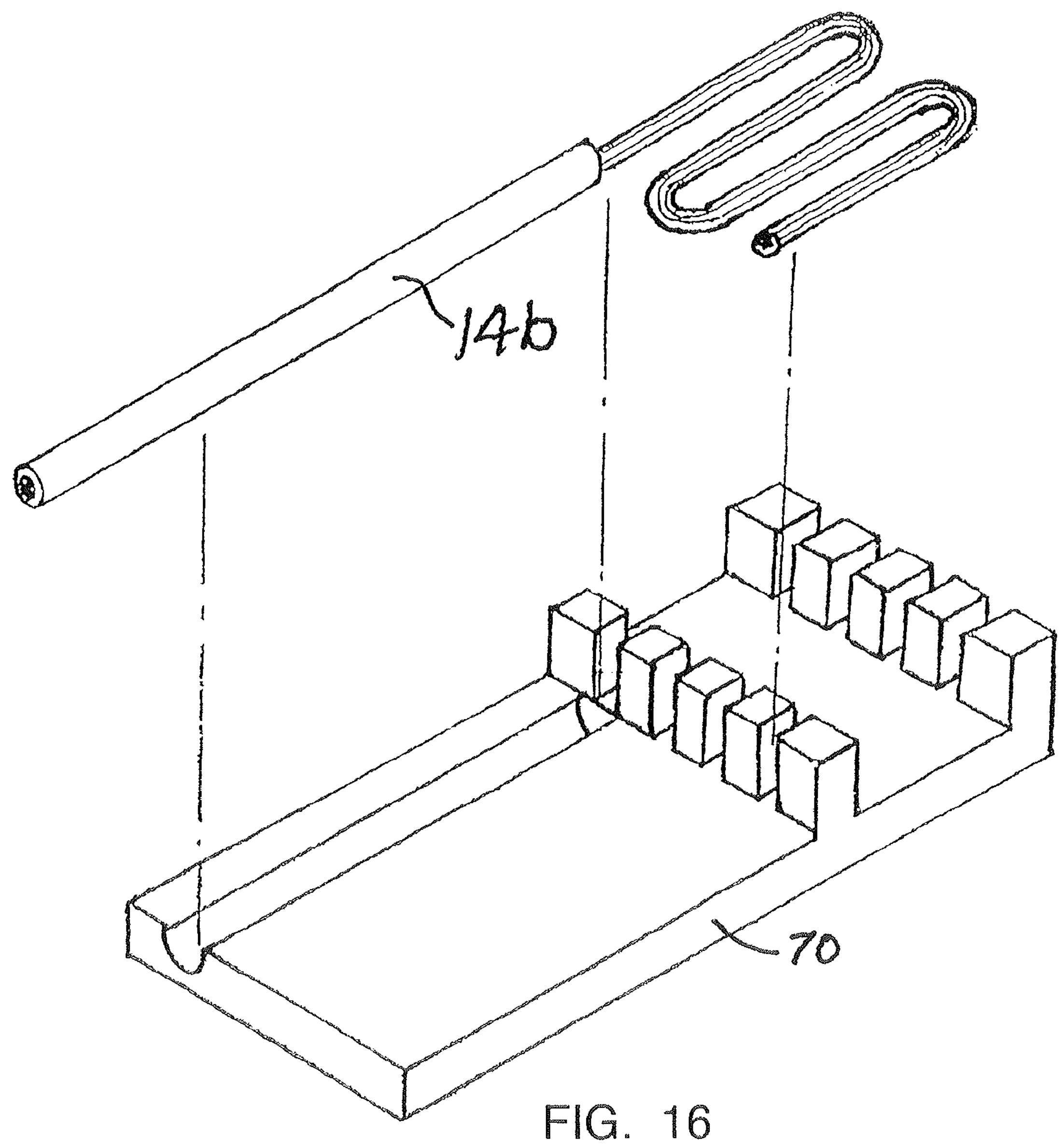
FIG. 16 is an exploded perspective view of another wire forming tool and a stranded wire conductor formed by the tool.

FIG. 16 is similar to FIG. 15, previously discussed with reference to termination 10, and illustrates an insulated stranded wire conductor 14*b* having a terminal portion stripped of insulation for forming using a forming tool such as the one shown and indicated generally at 70. The formed conductor 14*b* shown in FIG. 16 has a serpentine bend and includes a series of four (4) successive rectilinear contact portions for loading in spaces between columns of primary energy directors 41, 41 on an energy director cap 24 (not shown).

I claim:

1. Carbon fiber heating element assembly comprising:

a flexible carbon fiber tow of indeterminate length having a multiplicity of axially elongated carbon fibers, a metal electrical conductor having a plurality of discrete contact portions disposed in transverse overlying engagement with said tow and forming a matrix of discrete junctions therewith, a termination assembly including a lower energy director cradle and an energy director cap having respectively associated opposing cradle and cap clamping surface, said termination assembly including a matrix of fusions integral to both the cradle and the cap and maintaining the cradle and the cap clamping surface in parallel spaced apart relation to each other and in clamping engagement with the conductor contact portions and the tow, less than all of the fusions having carbon fibers associated with the tow embedded therein, the contact portions being in underlying bearing engagement with the cap clamping surface, the tow being in overlying bearing engagement with the cradle clamping surface, the cradle being free of embedded carbon fiber associated with the tow in a region underlying the cradle clamping surface and extending between fusions bordering the tow.

2. Carbon fiber heating element assembly as set forth in claim 1 wherein said fusions are arranged in columns and rows and said matrix of fusions is further characterized as a rectangular matrix of fusions.

3. Carbon fiber heating element assembly as set forth in claim 1 wherein said electrical conductor comprises a slotted metal plate.

4. Carbon fiber heating element assembly as set forth in claim 3 wherein said slotted metal plate includes an integral male electrical connector tab projecting from and exposed externally of said termination assembly for mating connection with an associated female electrical connector.

5. Carbon fiber heating element assembly as set forth in claim 3 wherein said slotted portion of said metal plate comprises said discreet contact portions.

6. Carbon fiber heating element assembly as set forth in claim 1 wherein said conductor comprises a stranded wire and said contact portions thereof are formed by discreet strands of said wire separated from each other.

7. Carbon fiber heating element assembly comprising;

a heating element formed by a flexible carbon fiber tow of indeterminate length having a multiplicity of elongated carbon fibers arranged in generally parallel relation to each other within a single bundle, said single bundle having a termination portion defined by the division of said single bundle into a plurality of discreet stacks of approximately equal size, a metal electrical connector having a plurality of elongated discreet contact portions disposed in transversely overlying engagement with said stacks and cooperating therewith to form a generally rectangular matrix of discreet electrical junctions, and a dielectric ultrasonically weldable termination assembly including an energy director cradle and an energy director cap having respectively associated cradle and cap flat clamping surfaces, prior to assembly said cradle clamping surface having an integral assemblage of secondary energy directors integrally formed thereon and projecting therefrom in columns and rows forming a rectangular matrix of secondary energy directors, prior to assembly, said cap clamping surface having an assemblage of primary energy directors integrally formed thereon and projecting therefrom in columns and rows forming a rectangular matrix of primary energy directors in opposing registry to said rectangular matrix of secondary energy directors, each of said primary energy directors being substantially larger then an associated secondary energy director in opposing opposition therewith, said primary and secondary energy directors being joined by an ultrasonic welding process resulting in substantially total meltdown of said secondary energy directors and some meltdown of said primary energy directors, said meltdown producing a rectangular matrix of fusions integrally joined to said cradle and said cap at said clamping surfaces thereof, said fusions maintaining said cradle and cap clamping surfaces in parallel spaced apart relation to each other and in clamping engagement with said contact portions and said stacks, at least one and less than all of said fusions having carbon fiber received from said tow embedded therein, said contact portions being in underlying engagement with said cap clamping surface along the entire lengths thereof, said stacks being in bearing engagement with said cradle clamping surface, said cradle being free of embedded carbon fiber associated with said tow in the regions underlying said cradle clamping surface and extending between said fusions bordering on said stacks, whereby the integrity of said cradle clamping surface is retained.

8. Carbon fiber heating element assembly as set forth in claim 7 wherein the bases of said primary energy directors on said cap clamping surface define the boundaries of a rectangular area of termination on said cap clamping surface and the total base area of the primary energy directors on said cap clamping surface is equal to at least one half of said area of termination.

9. Carbon fiber heating element assembly as set forth in claim 7 wherein said primary energy directors are substantially larger than said secondary energy directors.

10. Carbon fiber heating element assembly as set forth in claim 9 wherein each of said primary energy directors has a height dimension measured from its associated clamping surface approximately twice that of each of said secondary energy directors.

11. Carbon fiber heating element assembly as set forth in claim 7 wherein spaces between adjacent columns of secondary energy directors carried by said energy director cradle define temporary guideways for use prior to and during termination assembly to position and support said stacks of carbon fiber of approximately equal size.

12. Carbon fiber heating element assembly as set forth in claim 7 wherein spaces between adjacent rows of primary energy directors carried by said energy director cap define temporary guidepaths for use prior to and during termination assembly to position and support said portions of said conductor.

13. Carbon fiber heating element assembly as set forth in claim 7 wherein said conductor comprises a stranded wire and said contact portions thereof are defined by discreet strands of said wire separated from each other.

14. Carbon fiber heating element assembly as set forth in claim 7 wherein said conductor comprises a slotted metal plate.

15. Carbon fiber heating element assembly as set forth in claim 14 wherein said slotted metal plate has a male connector tab extending from and exposed externally of said termination assembly to receive a female electrical connector thereon.

16. Carbon fiber heating element assembly as set forth in claim 7 wherein said conductor comprises an insulated electrical bus bar having an uninsulated part intermediate opposite ends thereof and a plurality of discreet parallel conductors exposed within said uninsulated part and defining said contact portions.

17. Carbon fiber heating element assembly as set forth in claim 7 wherein said conductor comprises an elongated wire having serpentine bends therein defining a plurality of spaced apart said contact portions adapted to be loaded into said energy director cap.

18. Carbon fiber heating element assembly as set forth in claim 7 wherein said tow has an electrical resistance in a range of two to three ohms per linear foot plus or minus 0.10 ohms.

19. Carbon fiber heating element assembly as set forth in claim 7 wherein each of said carbon fibers has a generally cylindrical cross section and a diameter in the range of six to ten microns.

20. Carbon fiber heating element assembly comprising:

a flexible carbon fiber tow of indeterminate length having a multiplicity of axially elongated carbon fibers, a metal electrical conductor having a plurality of discrete contact portions disposed in transverse overlying engagement with said tow and forming a rectangular matrix of discrete junctions therewith, a termination assembly including a lower energy director cradle and an energy director cap having respectively associated opposing cradle and cap clamping surface, said termination assembly including a rectangular matrix of fusions integral to and extending from and between both said cradle and said cap clamping surface and maintaining said cradle and said cap clamping surface in parallel spaced apart relation to each other and in clamping engagement with said conductor contact portions and said tow, at least one of said fusions having carbon fiber associated with said tow embedded therein, said contact portions being in underlying bearing engagement with said cap clamping surface, said tow being in overlying bearing engagement with said cradle clamping surface, said cradle being free of embedded carbon fiber associated with said tow in a region underlying said cradle clamping surface and extending between fusions bordering said tow.

* * * * *